2,994,653
METHOD OF CHLORINATING ALIPHATIC CHAIN-SUBSTITUTED AROMATIC HYDROCARBONS
George A. Miller, Painesville, Ohio, assignor to Diamond Alkali Company, Cleveland, Ohio, a corporation of Delaware
No Drawing. Filed Apr. 27, 1959, Ser. No. 808,946
23 Claims. (Cl. 204—163)

This is a continuation-in-part of my co-pending application Ser. No. 766,704, filed October 13, 1958.

The present invention relates to a new and improved method for chlorinating lower alkyl-substituted hydrocarbons in such a manner as to introduce chlorine into the aliphatic side chain under such conditions as to reduce ring chlorination as well as decomposition and polymerization impurities.

More particularly, the invention relates to a new process of chain chlorinating lower poly alkyl benzenes, specifically xylenes, i.e., chain chlorinating ortho-, meta- and para-xylenes.

The products of this new process comprise halogenated organic compounds which are valuable as chemical intermediates in the synthesis of glycols and esters and also have been found useful in pesticidal applications such as in the control of insect and nematode growth.

Prior methods in the chlorination of compounds of the above type, specifically for the chlorination of xylenes, have ordinarily been carried out by dissolving the xylene in a solvent, such as carbon tetrachloride, mixing or bubbling chlorine through the mixture while the chlorination is catalyzed either by light or an oxidizing agent. These chlorinated products are then isolated by distillation at reduced pressure or through separation by crystallization.

It is known that in order to avoid ring chlorination of xylenes, chlorination must be carried out in the absence of metallic ions, particularly iron, aluminum and zinc ions. If the reaction mixture is not free of metallic ions, i.e., having a concentration of no more than .0004% (4 p.p.m.) metal ions, a substantial amount of undesirable byproducts, such as ring-chlorinated xylenes and polymerized byproducts, are formed reducing the commercial feasibility and also the quality and purity of yield. This is particularly true in higher chain-chlorinated xylenes, such as hexachloro-p-xylene and hexachloro-m-xylene; however, preparation of other chlorinated xylenes involves the same difficulties, e.g., α,α'-dichloro-p-xylene, α-chloro-p-xylene, α,α,α',α'-tetrachloro-p-xylene.

Therefore, the addition of a metal ion sequestering agent has been found to be necessary in most instances, i.e., an agent which suppresses the decomposition activity of metallic impurities.

Ordinarily, elimination of contaminating metal ions, such as iron, zinc, aluminum, iron oxide, and ferric chloride, is typically attempted by employing glass or ceramic-lined equipment. However, this is often unsuccessful in that although due caution is exercised, bits of rust, dirt or other impurities may be blown, dropped or in other ways placed in the reaction system. The present invention overcomes this drawback.

Broadly, the present invention is directed to a process of preparing aliphatic chain-chlorinated aromatic hydrocarbons which comprises chlorinating an aliphatic chain-substituted aromatic hydrocarbon in the presence of an organic phosphate, preferably triphenyl phosphate, triethyl phosphate, or other aromatic hydrocarbon soluble aryl or alkyl phosphates or an aliphatic polyhydroxy-substituted hydrocarbon, such as polyethylene glycol, polypropylene glycol, pentaerythritol and mannitol, preferably sorbital and alternately in the presence of a combination of these compounds, preferably in the presence of triphenyl phosphate or triethyl phosphate alone.

Organic phosphate as employed in the specification and claims is intended to refer broadly to compounds of the structure:

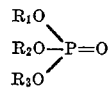

wherein $R_1$, $R_2$, and $R_3$ are selected from the group consisting of alkyl radicals, e.g., those alkyl radicals having from 1 to 30 carbon atoms such as methyl, ethyl, propyl, butyl, octyl, decyl, and eicosyl radicals, aryl radicals, e.g., phenyl and naphthyl radicals, hydroxyaryl radicals, e.g., 2-hydroxyphenyl, 2-4-dihydroxyphenyl, 2-hydroxynaphthyl, haloaryl radicals, e.g., 2-chlorophenyl, 2,4-dichlorophenyl, 2-bromophenyl, and 2-chloronaphthyl radicals, hydroxyalkyl radicals, e.g., 2-hydroxyethyl, dihydroxypropyl, and trihydroxyoctyl radicals. An aryl phosphate is intended to refer broadly to the structure set forth above wherein at least one of the R groups is aryl. Further, an alkyl phosphate is intended to refer broadly to the above structure wherein at least one of the R groups is alkyl.

Illustrative of aliphatic chain-substituted aromatic hydrocarbons which may be chlorinated by the practice of this invention are: ortho-, meta- and para-xylenes, toluene, diethylbenzene, triethylbenzene, diisopropylbenzene, mesitylene, cymene, durene and ethylbenzene.

The process is typically carried out in a reactor formed of steel, iron or any other conventional material of construction, typically a glass-lined reactor, equipped with agitation means, chlorine inlet means, hydrocarbon inlet, e.g., xylene inlet, temperature control means and product outlet. The chlorination may be carried out generally at a temperature in the range of about 10° to 200° C., e.g., preferably at a temperature in the range of about 40° to 150° C. The reaction is normally carried to completion, i.e., as determined by evolution of the desired amount of hydrogen chloride. The product desired will dictate the amount of chlorine to be added in view of the fact that essentially the stoichiometric amount or a slight excess normally is added. A substantial excess of chlorine may be desirable in certain instances where a highly chlorinated material is desired such as in the chlorination of xylene to produce α,α,α,α',α',α'-hexachloro-p-xylene. However, by employing less than the theoretical amount of chlorine required, over-chlorinated products, such as α,α,α',α'-tetrachloro-p-xylene and α,α,α'-trichloro-p-xylene in the preparation of α,α'-dichloro-p-xylene and α-chloro-p-xylene, will be substantially avoided.

The organic phosphate, either alone or with sorbitol, is generally added to the aliphatic chain-substituted aromatic hydrocarbon before the initial chlorination. Generally, .001% to 1%, e.g., .01% to 1% by weight of organic phosphate alone or together with .001% to 1%, e.g., .01% to 1% of sorbitol will substantially stabilize and prevent decomposition of the chlorinated product. Although it is desired that such a sequestering agent or agents be added before the initial chlorination step, in certain instances, it may be desirable to add the sequesterant during the chlorination should the chlorination mixture become contaminated with metallic ions. Ordinarily, less than 1% by weight of triethyl phosphate, triphenyl phosphate or sorbitol alone, or in combination, will satisfactorily depress the activity of metal ion contaminants; however, in certain instances, a higher concentration may be desirable due to excessive contamination, e.g., a concentration as high as 5% sorbitol and organic phosphate, either singly or in combination.

An illustrative application of the sequestering agent of the present invention is that in which p-xylene is chlorinated in the preparation of α,α,α,α',α',α'-hexachloro-p-xylene. In this reaction, typically 2 to 4 moles of p-xylene are charged to a reactor in combination with 0.1% to 1.0% based on the weight of xylene of sorbitol and organic phosphate, either alone or in combination. The reaction mixture is agitated and heated, i.e., to a temperature of about 50° to 70° C., and chlorine is added at a rate which maintains good chlorine utilization efficiency. The chlorination is catalyzed by either illumination or a free radical catalyst, e.g., a mercury vapor lamp in a cooled immersion well as the source of illumination. The source of illumination may also be any light producing actinic rays, e.g., fluorescent lamps, either white, blue or black, or clear, unfrosted incandescent lamps. The reaction temperature is gradually increased through the range of 50° to 150° C. during chlorination. The chlorination is ended when the reaction product has a set point at a temperature between 95° to 100° C., i.e., when the chlorine utilization drops below about 1%.

Upon chlorination completion, excess chlorine and hydrogen chloride are removed from the product by any convenient means such as blowing the reaction mixture with an inert gas, e.g., nitrogen or air while the mixture is being held at a temperature of about 110° to 150° C. The reaction product, i.e., the α,α,α,α',α',α'-hexachloro-p-xylene is either filtered and washed with an organic solvent, such as isopropanol, or the crude chlorinated mixture is digested in isopropanol employing a volume ratio of isopropanol to α,α,α,α',α',α'-hexachloro-p-xylene of about 1 to 3. When employing isopropanol as the digesting solvent, the solvent temperature typically rises from about 30° to 40° C. to about 60° to 80° C. The resulting crystals are filtered and washed with isopropanol. Employing the triphenyl phosphate and sorbitol in combination with the isopropanol digestion, a product having a melting point between 106°–112° C. is obtained in pure yields of 70% to 90%.

A similar α,α,α,α',α',α'-hexachloro-p-xylene preparation via chlorination of p-xylene but employing no sequestering agent, i.e., sorbitol and/or triphenyl phosphate, with an iron or metallic ion contamination of .004% to .01% typically results in a decomposed highly polymerized crude reaction mass which darkens before 0.25 mole of chlorine per mole of xylene is added.

Another illustrative process within the scope of the present invention is that comprising the use of triphenyl phosphate and sorbitol, either in combination or alone, in the preparation of lower alkyl chain-substituted benzenes or naphthalenes having less than six chlorine atoms substituted on the lower alkyl groups, specifically α,α'-dichloro-p-xylene (xylylene dichloride) and α-chloro-p-xylene (xylyl chloride). Typically, in this preparation, the reactants are combined in proportions of 1 mole of xylene to 0.9 to 1.8 moles of chlorine. The chlorination is catalyzed by light or other means as above in the preparation of α,α,α,α',α',α'-hexachloro-p-xylene; however, it is carried out at a temperature between 30° and 70° C., e.g., 45° to 55° C., in the absence of a solvent. From .001% to 1.0%, e.g., .01% to 1.0%, of triphenyl phosphate and sorbitol, either alone or in combination, are added to the xylene either before chlorination begins or when contamination with metallic ions becomes apparent. The chlorination typically is carried out over a period of about 2 to 6 hours, and upon chlorination completion the crude mixture is cooled to about 5° to 25° C., precipitating the desired p-xylylene dichloride. The p-xylylene dichloride may be digested with a digesting solvent, e.g., isopropanol, typically at an elevated temperature, e.g., 60° to 80° C.

Alternately, the chlorinated reaction product may be isolated through distillation, the xylylene dichloride distilling at 115° to 128° C. at 5 to 10 mm. mercury pressure. The sequestering agents of this invention being high boiling solids do not contaminate the distilled lower chlorinated reaction products; that is, the α-chloro-p-xylene may be recycled to another chlorination process or separated for later use without fear of side reaction or decomposition caused by the presence of the organic phosphate or sorbitol.

Employing these sequestering agents, typical yields are between 30% and 40% pure α,α'-dichloro-p-xylene. However, in the absence of the sequestering agents of the present invention, the reaction product is contaminated with undesired byproducts.

In order that those skilled in the art may more completely understand the present invention and the methods by which the same may be carried into effect, the following specific examples are offered.

EXAMPLE I

*Preparation of α,α'-dichloro-p-xylene employing triphenyl phosphate and sorbitol as sequestering and stabilizing agents*

Into a three-necked flask equipped with thermometer, addition tube and condenser is placed 212 g. of xylene (2.0 mol) and 0.6 g. each of sorbitol and triphenyl phosphate (0.3% by weight of xylene). 0.0012 g. of ferric oxide (4 p.p.m. iron) is added and the mixture is heated to a temperature of about 70° C. The triphenyl phosphate dissolves while the sorbitol remains and is only partially soluble. Chlorination is then carried out by passing gaseous chlorine into the reaction mixture until 1.6 mols of chlorine per mole of xylene is reacted, measured by the amount of hydrogen chloride evolution. During chlorination, the reaction is catalyzed by illumination from two blue 15-watt fluorescent lamps placed about 2–3 inches away from opposite sides of the flask. The solution remains clear and colorless throughout the chlorination, the desired product being isolated through distillation at reduced pressure. 110 g. of α,α'-dichloro-p-xylene (34.0% pure yield) and a mixture of lower chlorinated xylenes result, thus demonstrating that no decomposition or polymerization results when employing these sequestering agents of the present invention.

EXAMPLE II

Employing the procedure given in Example I, α,α'-dichloro-p-xylene is prepared in the presence of iron, i.e., at a concentration of 4 p.p.m. iron in the form of ferric chloride. Results of this preparation indicate that α,α'-dichloro-p-xylene may be prepared in better than 30% pure yield when the chlorination mixture is contaminated with ferric chloride if the sequestering agents of the present invention, i.e., triphenyl phosphate and sorbitol are employed.

EXAMPLE III

*Preparation of α,α'-dichloro-p-xylene in the absence of sequestering agents*

Employing the procedure given in Example I, 424 g. of p-xylene (4.0 mols) is added to 0.0024 g. of iron oxide (4 p.p.m. iron). No sorbitol or triphenyl phosphate is added to this mixture. The reactants are heated to about 70° C. and gaseous chlorine is introduced; immediately a dark green color develops and before 0.25 mole of chlorine is added, the efficiency of the chlorination is reduced to the point at which chlorination stops, the reaction mixture being in such a state that isolation of any product is uneconomical.

EXAMPLE IV

*Preparation of α,α'-dichloro-p-xylene in the presence of iron as ferric chloride and in the absence of sequestering agents*

Employing the procedure given in Example III with the exception that the contaminating ion is added in the form of ferric chloride is carried out, a similar decomposed product is obtained, thus demonstrating that in the presence of iron contamination, a sequestering agent is necessary.

EXAMPLE V

*Preparation of α,α'-dichloro-p-xylene in the presence of contaminating iron employing triphenyl phosphate alone as a sequestering agent*

The procedure in Example I is carried out employing 0.6 g. of triphenyl phosphate in place of a combination of sorbitol and triphenyl phosphate as sequestering agents. Upon reaction completion, it is found that even though iron contaminates the reaction mixture, a better than 30% pure yield of the desired product results.

EXAMPLE VI

*Preparation of α,α,α,α',α',α'-hexachloro-p-xylene employing triphenyl phosphate and sorbitol as sequestering and stabilizing agents*

0.6 g. each of sorbitol and triphenyl phosphate (0.3% by weight of xylene) are added to 212 g. of p-xylene (2.0 mols) in a three-necked flask, followed by the addition of 0.0012 g. of iron oxide (4 p.p.m. iron). The reaction mixture is heated to 70° C. and gaseous chlorine is introduced. The chlorination is catalyzed by illumination from a clear 100-watt incandescent lamp placed about 2 inches from the flask. Following an induction period, the solution remains clear and colorless. Upon addition of 0.7 mole of chlorine per mole of xylene, the reaction mixture is still clear and colorless. The chlorination is continued until 8.0 moles of gaseous chlorine per mole of xylene is added, the temperature of the reaction mixture rising from 70° C. to about 145° C. The reaction mixture is then combined with an equal volume of chilled isopropanol, cooled and filtered, yielding a product having a melting point of 110°–112° C. This demonstrates that although a contaminating amount of iron ion may be present, a significant yield of the desired hexachloro-p-xylene may be prepared when employing the sequestering agents of the present invention.

EXAMPLE VII

*Preparation of α,α,α,α',α',α'-hexachloro-p-xylene in the presence of contaminating metallic ions and in the absence of sequestering and stabilizing agents*

The procedure given in Example VI previously is carried out with the exception that the sequestering agents, i.e., sorbitol and triphenyl phosphate, are omitted. Upon chlorination, a contaminated and highly decomposed product results.

EXAMPLE VIII

*Preparation of α-chloro-p-xylene in the presence of triphenyl phosphate and sorbitol as sequestering agents and in the presence of iron oxide as the contaminant*

The procedure given in Example I is carried out with the exception that the chlorination temperature is maintained at about 70°–100° C. The chlorination is stopped when 0.9 mole of chlorine have been added. Isolation is carried out by distillation at reduced pressure yielding 147 g. of α-chloro-p-xylene (better than 50% crude yield). The desired product results with little or no decomposition of the chlorination mixture.

EXAMPLE IX

*Preparation of α,α,α,α',α',α'-hexachloro-p-xylene in the presence of triphenyl phosphate as a sequestering and stabilizing agent and in the presence of iron oxide as the contaminating agent employing the mother liquor from the initial preparation of α,α'-dichloro-p-xylene as a starting material*

The mother liquor from the initial preparation of α,α'-dichloro-p-xylene given in Example I is mixed with 0.3% by weight of the mother liquor of triphenyl phosphate (2.9 g.). 948 g. (6.0 mols) of the mother liquor in combination with triphenyl phosphate is heated to about 80° C. in a three-necked flask, whereupon gaseous chlorine is introduced, the temperature of the reaction mixture rises to about 140° C. The reaction is catalyzed by actinic rays from two 15-watt fluorescent lamps placed about 2–3 inches away from opposite sides of the flask. Upon evolution of 4.8 moles of hydrogen chloride per mole of the original mother liquor, the reactant mixture is allowed to cool, resulting in 1468 g. of the desired hexachloro-p-xylene (4.7 mols) which upon recrystallization has a melting point of 105°–109° C. This represents a better than 60% yield based on the starting material, thus demonstrating that in a continuous process, the sequestering agents of the present invention may be added at any stage of preparation to suppress the contaminating action of metal ion in the reactant stream.

EXAMPLE X

*Preparation of α,α,α,α',α',α'-hexachloro-m-xylene in the presence of iron oxide as a contaminating agent and in the presence of triphenyl phosphate and sorbitol as sequestering agents*

The procedure given in Example VI in the preparation of α,α,α,α',α',α'-hexachloro-p-xylene is repeated with the exception that m-xylene is employed as the initial starting product. Upon chlorination completion, a significant yield of the desired hexachloro-m-xylene is obtained, thus demonstrating that m-xylene may be chlorinated in the presence of contaminating metal ions when the chlorination is carried out in the presence of the sequestering agents of the present invention.

EXAMPLE XI

*Preparation of α,α,α,α',α',α'-hexachloro-m-xylene in the presence of contaminating iron oxide and in the presence of triphenyl phosphate as a sequestering agent*

The procedure given in Example X is carried out with the exception that triphenyl phosphate alone is used in place of the triphenyl phosphate-sorbitol combination as sequestering agent. Upon chlorination completion and isolation of the desired product, little or no decomposition or polymerization is observed, thus demonstrating that triphenyl phosphate is singularly effective as a sequestering agent.

EXAMPLE XII

*Preparation of α,α,α,α',α',α'-hexachloro-p-xylene in the presence of contaminating iron oxide and in the presence of triethyl phosphate as a sequestering agent*

Into a three-necked flask equipped with thermometer, addition tube and condenser are placed 212 g. of xylene (2.0 mols) and 1.06 g. of triethyl phosphate (0.5% by weight of xylene). 0.0012 g. of ferric oxide (4 p.p.m. of iron) are added and the mixture is heated to a temperature of about 70° C. Chlorination is then carried out by passing gaseous chlorine into the reaction mixture until about 8.0 moles of gaseous chlorine per mole of xylene are added. During chlorination, the reaction is catalyzed by illumination from two 15-watt fluorescent lamps placed about 2–3 inches away from the flask. When the reaction is completed, the reaction mixture is combined with chilled isopropanol, cooled and filtered, yielding a product which, without further purification or recrystallization, has a melting point of 94°–95° C. The reaction mixture shows no discoloration during chlorination demonstrating that, even with a contaminating amount of iron ion present, the desired hexachloro-p-xylene may be prepared using alkyl phosphates as sequestering agents.

Since 8 moles of chlorine gas per mole of xylene are added without any evidence of contamination or decomposition, it is evident that the chlorine addition may be stopped at any point to yield lower alkyl chain-substituted benzenes or naphthalenes having less than six chlorine atoms substituted on the lower alkyl groups, e.g., α,α'-dichloro-p-xylene and α-chloro-p-xylene.

Moreover, ring and chain-chlorinated compounds, i.e.,

α,α',2,5 - tetrachloro - p - xylene, α,α,α,α',α',α',2,5 - octachloro-p-xylene, α,α',4,6 - tetrachloro-m-xylene, α,α',4-trichloro-m-xylene α,α,α,α',α',α',4 - heptachloro-m-xylene, α,α',2,3,5,6-heptachloro-p-xylene, α,α,α',α',2,5 - hexachloro-p-xylenes, may also be prepared by employing the organic phosphates alone or in combination with sorbitol according to the instant teachings. It is known in the art that ring-chlorinated xylenes are prepared by chlorination in the presence of metallic ions, i.e., iron oxide or ferric chloride, and it is also known that subsequently these ring-chlorinated compounds may be chain-chlorinated by removing the metallic ion and chlorinating in the presence of actinic radiation. However, it has been found that it is extremely difficult to remove the metallic ion producing decomposition of the desired chain-chlorinated compound. It has been found that this difficulty may be overcome by the employment of the sequestering agents of the present invention; that is, upon completion of ring chlorination, the resulting chlorinated mixture may contain as high as 4 p.p.m. contaminating metallic ion, addition of .001% to 5.0%, i.e., .01% to 2% of organic phosphate alone or in combination with .001% to 5.0%, i.e., .01% to 2%, sorbitol will sequester the decomposing of these metallic ions.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing a chain-chlorinated aliphatic chain-substituted aromatic hydrocarbon comprising chemically reacting under the catalytic influence of actinic light gaseous chlorine and an aliphatic chain-substituted aromatic hydrocarbon contaminated with metal ions in the presence of an organic phosphate selected from the group consisting of aryl phosphates and alkyl phosphates.

2. The method according to claim 1 wherein the organic phosphate is triphenyl phosphate and comprises about .001% to 1.0% by weight of the aliphatic side chain-substituted aromatic hydrocarbon.

3. The method according to claim 1 wherein the organic phosphate is triethyl phosphate and comprises about .001% to 1.0% by weight of the aliphatic side chain-substituted aromatic hydrocarbon.

4. The method of preparing chain-chlorinated methyl benzenes which comprises combining in the presence of contaminating metal ions a methyl benzene and an organic phosphate selected from the group consisting of aryl phosphates and alkyl phosphates, introducing gaseous chlorine and agitating the reaction mixture under the catalytic influence of actinic light, and maintaining a temperature in the neighborhood of about 10° C. to 200° C.

5. The method according to claim 4 wherein the organic phosphate is triphenyl phosphate.

6. The method according to claim 4 wherein the organic phosphate is triethyl phosphate.

7. The method according to claim 4 wherein the organic phosphate comprises about .001% to 1.0% by weight of the methyl benzene.

8. The method of preparing chain-chlorinated xylenes which comprises combining in the presence of contaminating metal ions xylene and an organic phosphate selected from the group consisting of aryl phosphates and alkyl phosphates, introducing gaseous chlorine, agitating the reaction mixture under the catalytic influence of actinic light, and maintaining a temperature in the neighborhood of about 10° C. to 200° C., wherein the organic phosphate comprises about .001% to 5.0% by weight of the xylene.

9. The method according to claim 8 wherein the organic phosphate is triphenyl phosphate.

10. The method according to claim 8 wherein the organic phosphate is triethyl phosphate.

11. The method of preparing α,α'-dichloro-p-xylene which comprises combining in the presence of contaminating metal ions xylene and an organic phosphate selected from the group consisting of aryl phosphates and alkyl phosphates, wherein the organic phosphate comprises about .001% to 5.0% by weight of the xylene, heating the mixture to about 10° to 100° C., introducing gaseous chlorine at a ratio of about 1 to 3 moles of chlorine to each mole of xylene and agitating the reaction mixture under the catalytic influence of actinic light.

12. The method according to claim 11 wherein the organic phosphate is triphenyl phosphate.

13. The method according to claim 11 wherein the organic phosphate is triethyl phosphate.

14. The method of preparing α-chloro-p-xylene which comprises combining in the presence of contaminating metal ions xylene and an organic phosphate selected from the group consisting of aryl phosphates and alkyl phosphates, wherein the organic phosphate comprises about .001% to 5.0% by weight of the xylene, heating the mixture to about 10° to 100° C., introducing gaseous chlorine in a ratio of about 0.5 to 2 moles of chlorine to each mole of xylene and agitating the reaction mixture under the catalytic influence of actinic light.

15. The method according to claim 14 wherein the organic phosphate is triphenyl phosphate.

16. The method according to claim 14 wherein the organic phosphate is triethyl phosphate.

17. The method of preparing α,α,α,α',α',α'-hexachloro-p-xylene which comprises combining in the presence of contaminating metal ions xylene and an organic phosphate selected from the group consisting of aryl phosphates and alkyl phosphates, wherein the organic phosphate comprises about .001% to 5.0% by weight of the xylene, heating the mixture to about 10° to 100° C., introducing gaseous chlorine in a ratio of about 6 to 12 moles of chlorine to each mole of xylene, agitating the reaction mixture under the catalytic influence of actinic light, increasing the temperature of the reaction mixture to a maximum of about 200° C. during chlorination and separating the chlorinated product.

18. The method according to claim 17 wherein the organic phosphate is triphenyl phosphate.

19. The method according to claim 17 wherein the organic phosphate is triethyl phosphate.

20. The method of preparing α,α,α,α',α',α'-hexachloro-m-xylene which comprises combining in the presence of contaminating metal ions xylene and an organic phosphate selected from the group consisting of aryl phosphates and alkyl phosphates, wherein the organic phosphate comprises about .001% to 5.0% by weight of the xylene, heating the mixture to about 10° to 100° C., introducing gaseous chlorine in a ratio of about 6 to 12 moles of chlorine to each mole of xylene, agitating the reaction mixture under the catalytic influence of actinic light, increasing the temperature of the reaction mixture to a maximum of about 200° C. during chlorination and separating the chlorinated product.

21. The method according to claim 20 wherein the organic phosphate is triphenyl phosphate.

22. The method according to claim 20 wherein the organic phosphate is triethyl phosphate.

23. The method of preparing xylene derivatives having chlorine atoms substitute both on the ring and the side chain which comprises chemically reacting in the presence of contaminating metal ions gaseous chlorine and a xylene having chlorine substituted only on the ring, which reaction is carried out in the presence of an organic phosphate selected from the group consisting of triphenyl phosphate and triethyl phosphate and under the catalytic influence of actinic light.

(References on following page)

References Cited in the file of this patent

UNITED STATES PATENTS

| | | |
|---|---|---|
| 2,446,430 | Norton | Aug. 3, 1948 |
| 2,817,633 | Mayor | Dec. 24, 1957 |

FOREIGN PATENTS

| | | |
|---|---|---|
| 259,329 | Great Britain | Oct. 14, 1926 |

OTHER REFERENCES

Ellis: Chemistry of Petroleum Derivatives, vol. I (1934), pp. 770–771.